No. 881,319. PATENTED MAR. 10, 1908.
A. HOLPUCH.
HORSE SANITARY PAN.
APPLICATION FILED OCT. 11, 1907.
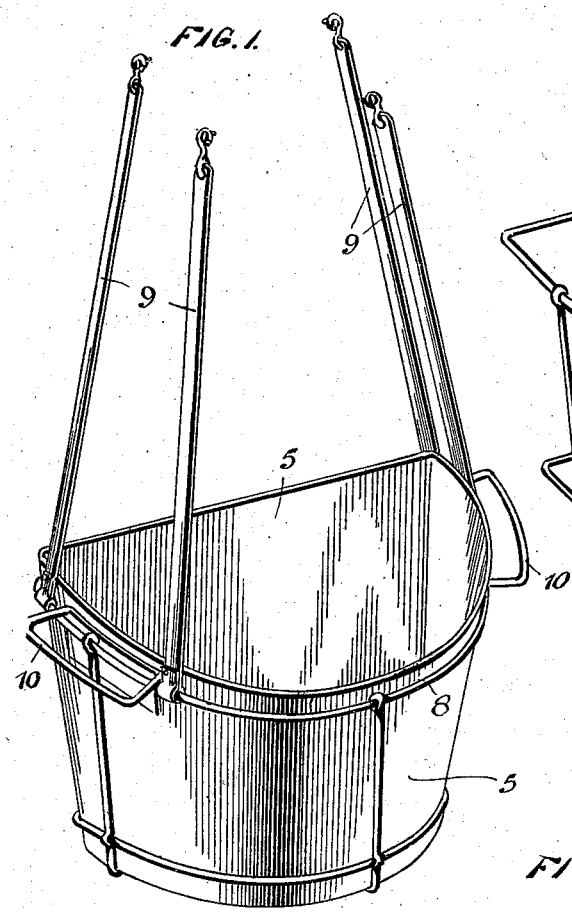
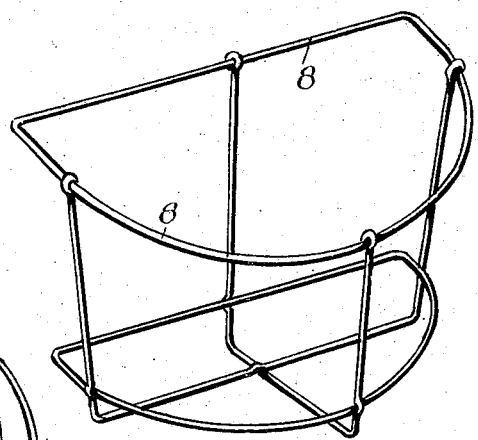
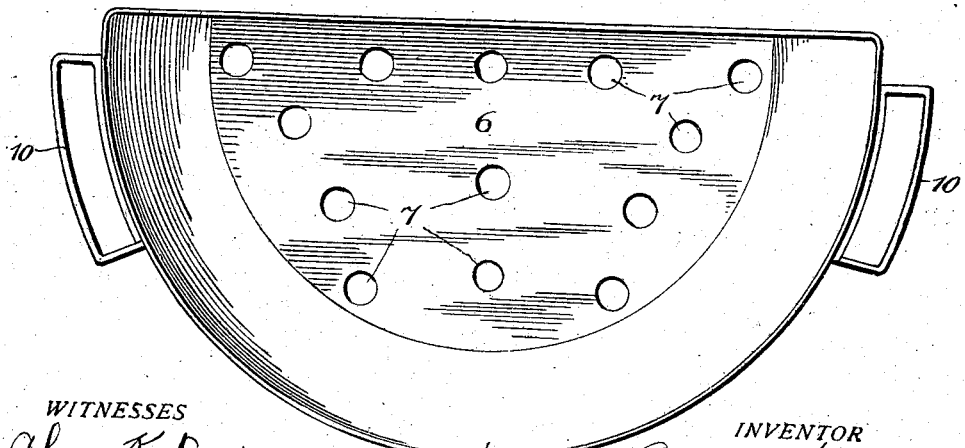
WITNESSES
Chas. K. Davis.
Myron T. Clean
INVENTOR
Anton Holpuch,
by C. L. Parker
Attorney
THE NORRIS PETERS CO., WASHINGTON, D. C.

UNITED STATES PATENT OFFICE.

ANTON HOLPUCH, OF CHICAGO, ILLINOIS.

HORSE SANITARY PAN.

No. 881,319.  Specification of Letters Patent.  Patented March 10, 1908.

Application filed October 11, 1907. Serial No. 397,034.

*To all whom it may concern:*

Be it known that I, ANTON HOLPUCH, a citizen of the United States, residing at Chicago, in the county of Cook and State of Illinois, have invented certain new and useful Improvements in Horse Sanitary Pans, of which the following is a specification.

This invention relates to manure pouches for domestic animals and aims to provide a device of this character that will be simple in its construction, efficient in operation, and capable of immediate adjustment or removal.

Another object of this invention is to provide a receptacle that will keep the stall clean and sanitary and which can be secured upon the animal in an inconspicuous position without discomfort to the animal itself.

Referring specifically to the accompanying drawing forming part of this specification and in which like numerals designate like parts throughout the several views, Figure 1 is a perspective view of a manure pouch constructed in accordance with my invention with all parts assembled in position for attachment, Fig. 2 is a detail perspective view of a wire-basket adapted to receive a removable manure receptacle, and Fig. 3 is a plan view of said receptacle.

In the practical embodiment of my invention I employ a pan or pouch 5 of leather, metal, or other suitable material, of a semicylindrical shape and tapering slightly from top to bottom. The bottom 6 is perforated irregularly with small holes 7 to permit of the passage therethrough, of urine and moisture. This pan or pouch 5 is adapted to fit loosely within a wire basket 8 which is similarly shaped and from which it may be readily removed.

Handles 10 are provided on either side of the pouch to facilitate handling. To the upper wire of this wire-basket 8 are secured by any suitable means a plurality of supporting straps 9, the opposite end of which are provided with snap-hooks or like fastening-means for attaching same to the harness upon the animal.

When the animal is standing in the stall a band or strap must be provided, but while the horse is being driven the manure pouch may be attached to suitable portions of the harness ordinarily used.

In operation, the pan or pouch 5 is placed within the wire-basket 8 of the supporting straps 9 attached to suitable portions of the harness so that the pouch will hang in the rear of the animal without interfering with its movements. Whenever necessary occasion arise the pan may be instantly removed and its contents emptied or the entire appliance may be readily detached or shifted from one animal to another.

Having described my invention, I claim

1. A manure pouch comprising a wire-basket adapted to be detachably secured to a harness upon an animal and a removable receptacle adapted to fit within said wire-basket, substantially as described.

2. A manure pouch comprising a wire-basket adapted to be detachably secured by supporting straps to a harness upon an animal, and a semicylindrical receptacle adapted to fit within said wire basket, substantially as described.

3. A manure pouch comprising a wire-basket adapted to be detachably secured to a harness upon an animal and a semicylindrical receptacle having a perforated bottom adapted to fit loosely within said wire-basket, substantially as described.

4. In a device of the character described, the combination of a wire-basket, a plurality of supporting-straps for attaching said basket to a harness upon an animal, and a semicylindrical receptacle having a perforate bottom adapted to fit within said wire-basket, substantially as described.

In testimony whereof I affix my signature in presence of two witnesses.

ANTON HOLPUCH.

Witnesses:
 JOHN W. BRITTON,
 ISADORE WINITSKY.